(12) United States Patent
Bade et al.

(10) Patent No.: US 7,653,819 B2
(45) Date of Patent: Jan. 26, 2010

(54) SCALABLE PAGING OF PLATFORM CONFIGURATION REGISTERS

(75) Inventors: Steven A. Bade, Georgetown, TX (US); Charles Douglas Ball, Raleigh, NC (US); Ryan Charles Catherman, Raleigh, NC (US); James Patrick Hoff, Raleigh, NC (US); James Peter Ward, Apex, NC (US)

(73) Assignee: Lenovo Singapore Pte Ltd., Singapore (SG)

( * ) Notice: Subject to any disclaimer, the term of this patent is extended or adjusted under 35 U.S.C. 154(b) by 862 days.

(21) Appl. No.: 10/957,545

(22) Filed: Oct. 1, 2004

(65) Prior Publication Data

US 2006/0075223 A1  Apr. 6, 2006

(51) Int. Cl.
*G06F 21/00* (2006.01)
(52) U.S. Cl. .............................. 713/187; 713/2; 713/189
(58) Field of Classification Search .................. 713/1, 713/2, 187, 189
See application file for complete search history.

(56) References Cited

U.S. PATENT DOCUMENTS

| 6,058,463 | A | 5/2000 | Langan et al. ............... 711/202 |
| 6,198,691 | B1 | 3/2001 | Yach ........................ 365/238.5 |
| 6,199,156 | B1 * | 3/2001 | Yoder et al. .................. 712/228 |
| 7,318,150 | B2 * | 1/2008 | Zimmer et al. ................. 713/2 |
| 2001/0030905 | A1 | 10/2001 | Yach ........................ 365/238.5 |
| 2003/0033537 | A1 * | 2/2003 | Fujimoto et al. ............. 713/193 |
| 2003/0163711 | A1 * | 8/2003 | Grawrock .................... 713/189 |

OTHER PUBLICATIONS

Vivek Sarkar et al., "Register-Sensitive Selection, Duplication, and Sequencing of Instructions," 2001, pp. 277-288.
Jeff Draper et al., "The Architecture of the DIVA Processing-In-Memory Chip," 2002, pp. 14-25.
V. Guruprasad, "A Self-Managing Addressing, Naming and Routing Service," *INSPEC*, 2002, 1 page.

* cited by examiner

*Primary Examiner*—Gilberto Barron, Jr.
*Assistant Examiner*—Christopher B Archer
(74) *Attorney, Agent, or Firm*—Winstead P.C.

(57) ABSTRACT

A method, computer program, and system for paging platform configuration registers in and out of a trusted platform module. In a trusted computing platform, an unlimited number of platform configuration registers can be obtained through paging. The trust platform module encrypts and decrypts platform configuration registers for storage outside the trusted platform module.

20 Claims, 7 Drawing Sheets

SCALABLE PAGING OF PLATFORM CONFIGURATION REGISTERS

TECHNICAL FIELD

The present invention relates in general to trusted computing, and in particular, to scalable platform configuration registers in trusted computing platforms.

BACKGROUND INFORMATION

Trusted computing involves incorporating security measures into the core of a computing platform. Although administrators may achieve limited security using software-based security, administrators can only trust such software-based security to the extent they trust the hardware or software running the software-based security application. For example, a virus in the Master Boot Record (MBR) could load before the operating system and cause damage that remains undetected by any software-based security applications run by the operating system. To achieve trusted computing, an administrator needs confidence that a wrongdoer has not maliciously modified the software, firmware, and hardware since the last system boot. In other words, an administrator should feel confident that the combination of hardware and software that comprise the platform is operating properly and according to some specification. In order to compare the state of the platform to a specification, an administrator needs the ability to reliably measure and report information about the platform. This measured information is then validated to declare that the platform is exactly what it says it is and can be trusted for a given purpose. The goal of trusted computing is to provide confidence in the state of the data processing system from power-up to shutdown.

One method to provide administrators with such confidence is through the use of a separate, secure piece of hardware known as a Trusted Platform Module (TPM). A TPM could be made according to specifications recognized by the Trusted Computing Group (TCG). The TCG is an industry-standards organization that promotes security across computing platforms in personal computers (PCs), personal digital assistants (PDAs), and mobile phones, for example. TCG provides specifications for TPMs to allow computer administrators to assert ownership of a platform while allowing users the ability to perform job functions. The TPM specification defines a Core Root of Trust for Measurement (CRTM) to ensure compatibility and security among computing platforms. The TPM is also known as the "Hardware Root of Trust."

A root of trust is a set of unconditionally trusted functions that serve as the foundation on which all other trust is built. Upon booting up a computer, the execution of the platform begins with execution of the CRTM. For a PC, the CRTM may either be the entire BIOS boot block or a portion of the BIOS boot block. The integrity of the CRTM is the foundation for the trust in the rest of the system after boot-up. Therefore, both the CRTM and TPM should be protected against hardware and software attacks.

The CRTM measures the integrity of software during boot-up and runtime. For a PC, the CRTM measures the code in the BIOS, MBR, and possibly other firmware. The CRTM can measure the code by performing a hash function on the code. These measurements reflect the state of the software at the time of the hash. The CRTM then reports the measurements to the TPM. Upon receiving the measurements, the TPM may compare the measurements to known values. If the measurements do not match the known values, the system may stop booting or report the measurements as "not trusted" after the boot sequence is finished.

The CRTM provides security throughout the boot and run process by extending the root of trust into a chain of trust. The chain of trust provides assurance that the system boot was carried out by trusted firmware and that every application since the boot can be trusted. In a PC, the chain of trust begins by the CRTM measuring and reporting on itself. The CRTM then first measures and reports on the BIOS. The BIOS then measures and reports on the boot loader. The boot loader, in turn, measures the operating system (OS) kernel. The OS then uses the TPM to measure drivers and other applications. In summary, every TCG compliant software module must measure any modules that it calls. With this system, as long as software is measured and the result stored before execution, any unauthorized software cannot hide itself. If unauthorized software is present, it will be reflected in an unexpected hash result stored by the TPM.

The TPM stores hash results in Platform Configuration Registers (PCRs) and a corresponding measurement log in memory external to the TPM. The PCRs contain values representing the sequence of measurements and the measurement log contains a full history of all measurements. The log and PCR values can be used to validate one another. In an example of this process, the CRTM creates a hash of the software about to run and then reports a description of the measured software and the measurement itself to the TPM. The TPM stores the description and measurement in a log. Next the TPM appends the measurement to the value already stored in the appropriate PCR, hashes this new value, and replaces the existing value in the PCR with the new hashed value. A platform's specification may dictate to which PCR a measurement is stored.

In a trusted platform implementing TCG specifications, the hash function is referred to as a SHA-1 function. A PCR contains what may be known as a SHA-1 digest, which is just the value representing the hash of the measured code. PCRs are initialized to zero at boot up. According to TCG specifications, the SHA-1 function concatenates the present value of the SHA-1 digest with the code to be measured. The concatenated value is then hashed and the result is stored in a particluar PCR register. The data processing system then extends a given PCR by concatenating a new data or software with the stored value, hashing the concatenation, and storing the resulting hash value in the PCR. Therefore, as the process of measuring software proceeds, the SHA-1 digest contains the hash of a previously hashed value (i.e., the hash of a hash of a hash, etc.). Through such a sequence, a single PCR value can record a limitless sequence of values. In a TCG system, the value of the SHA-1 digest changes with each hash, but the address size of the SHA-1 digest is always 20 bytes.

A program may ask the TPM to "seal" objects or data to a certain PCR value. The PCR value represents the platform state. Sealing protects storage and allows access only when the platform state as recording in the PCR matches a certain value. Sealed data can only be unsealed if the PCR has a specified value. For example, a developer can seal certain data until after a program loads and runs three software programs, for instance the BIOS, the operating system, and a keyboard driver. After running the BIOS, the operating system, and the keyboard driver, the value in a specific PCR would be the correct value, assuming the system was secure to that point. If the value of the PCR reached the required state, the TPM would release a key to be used by an entity to access the data or code object.

Sealing data to a specific platform state can prevent a breach of confidential data when data storage is not under the designated software or when the data is moved to another platform. If unexpected software was booted or a virus entered the code about to be run, the PCR value will not match and the unseal will fail.

Sealing data to a particular platform state can also be referred to as "locking" the data. For example, a programmer could lock data to a keyboard driver. Only after the keyboard driver was loaded and measured could the data be accessed. This is because only after the keyboard code was measured and loaded would the platform state, as displayed by the PCR registers, be correct for unlocking the data.

Therefore, the TPM of a trusted platform can provide facilities for securely and reliably storing and reporting integrity metrics. However, problems exist because the secure storage is located within the TPM's random access memory (RAM) and is not meant to hold a large quantity of data. As a result, current hardware implementing TCG specifications supports only 16 PCRs. Having only 16 PCRs results in a lack granularity because there are only 16 PCRs to which to seal or lock data. A hypothetical trusted platform with 16 PCRs could call for all drivers to be locked to a value stored in PCR 8 (as in, PCR 8 of sixteen). As the system loaded and ran drivers, the state of PCR 8 would change as its value was hashed with code that was about to run. However, if one driver is changed at all, the value in PCR 8 would not match the sealed value, and the data would not be unlocked. In a circumstance in which new equipment is installed and therefore new drivers are loaded, the ability to seal and unseal data is compromised. What is needed is a more robust method for trusted platforms to seal data to PCRs.

SUMMARY OF THE INVENTION

The present invention addresses the foregoing by providing a method of managing platform configuration register values. In one embodiment of the present invention, a method for managing platform configuration registers includes receiving a request for a first PCR value and comparing the first PCR value to one or more loaded values stored in a PCR register stack. If the requested PCR value is not located within the PCR register stack, the PCR manager downloads an encrypted version of the PCR value into the PCR register stack. In one embodiment, the encrypted version of the PCR value which is downloaded is decrypted by a trusted platform module.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, refer to the following descriptions and accompanying drawings, in which.

DETAILED DESCRIPTION

Figure 1:
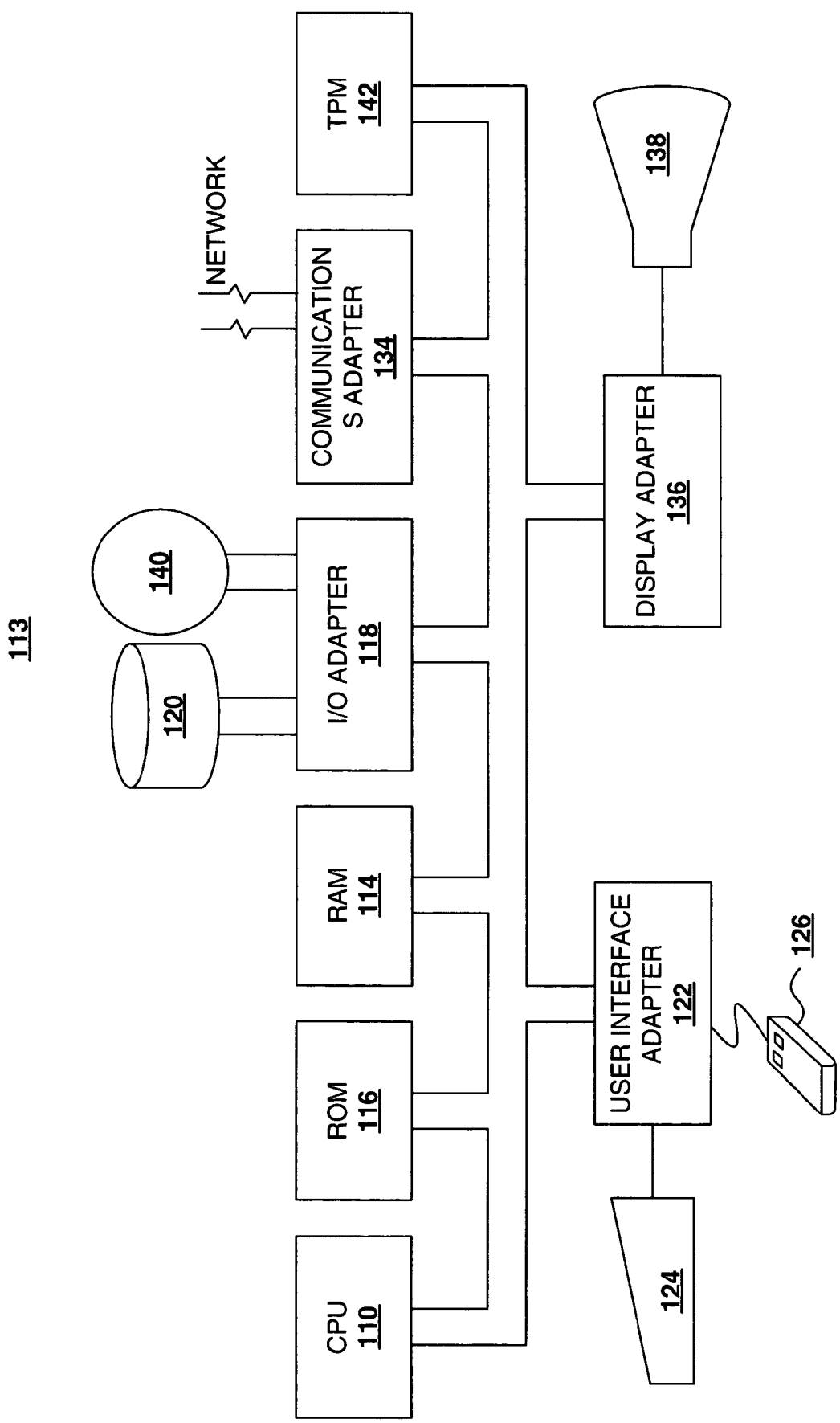
FIG. 1 illustrates a representative hardware environment for an embodiment of the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits, software routines, or systems have been shown in block diagram form or flow diagram form in order to prevent obscuring the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements may be designated by the same reference numeral through the several views.

Referring to FIG. 1, FIG. 1 illustrates a representative hardware environment for an embodiment of the present invention. Data processing system 113 is shown having central processing unit (CPU) 110, such as a conventional microprocessor, and a number of other units interconnected via system bus 112. Data processing system 113 could include random access memory (RAM) 114, read only memory (ROM) 116, and input/output (I/O) adapter 118 for connecting peripheral devices such as disk units 120 and tape drives 140 to bus 112. Data processing system 113 could include user interface adapter 120 for connecting keyboard 124, mouse 126, and/or other user interface devices such as a touch screen device (not shown) to bus 112. Further, processing system 113 could include communications adapter 134 for connecting data processing system 113 to a data processing network, and display adapter 136 for connecting bus 112 to display device 138. CPU 110 may include other circuitry not shown herein, which will include circuitry commonly found within a microprocessor, e.g., execution unit, bus interface unit, arithmetic logic unit, etc. CPU 110 may also reside on a single integrated circuit. Disk unit 120 could be any computable readable medium and could be used for storing a computer program embodiment in conjunction with the present invention. Item 142 represents a trusted platform module (TPM). The TPM could be any device that records or measures the operations of the code or data for subsequent verification by a challenger that correct data or code loading or execution has occurred as expected. The TPM could be any device that can also store cryptographic keys used to authenticate reported measurements. The TPM can have PCRs and other shielded locations used to protect and report integrity measurements.

The present invention may be embodied as a computer program product stored on, for example, a machine-readable medium as shown in FIG. 1 as item 120. The term "machine-readable medium" may include any medium used for providing instructions to CPU item 110 or other components of the data processing system shown as item 113 in FIG. 1. For example, machine-readable medium could be non-volatile media such as a floppy disk, memory stick, a flexible disk, a hard disk, magnetic tape or any other magnetic medium, a compact disc ROM (CD-ROM) or any other optical medium, or any other physical medium that data processing system 113 could use for reading and storing instructions. Further, TPM 142 could contain machine-readable medium from which to store and execute a computer program product in accordance with an embodiment of the present invention.

Figure 2:
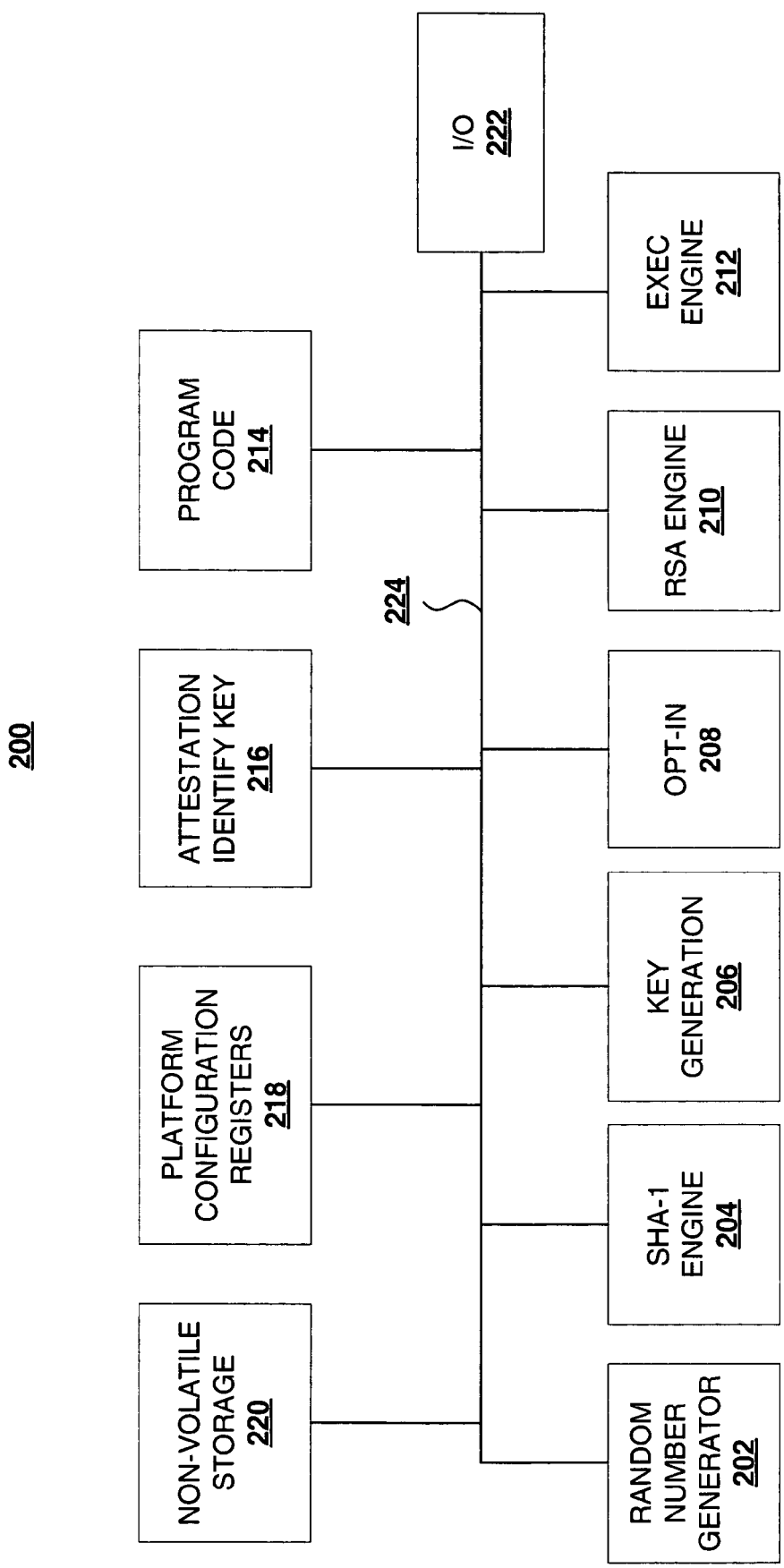
FIG. 2 illustrates example functionality provided by a trusted platform module (TPM) for an embodiment of the present invention.

Referring to FIG. 2, FIG. 2 illustrates functionality that may be provided by a trusted platform module (TPM), shown as item 200, for an embodiment of the present invention. Implementations of TPM 200 may be provided in hardware or software. As a building block of a trusted platform, TPM components may be trusted to work properly without additional oversight. Item 222 is an I/O component that manages information flow over the communication bus 224. Item 222 performs protocol encoding and decoding suitable for communication over external and internal buses. Item 220 is a Non-Volatile Storage and could be used to store endorsement keys, storage root keys, owner authorization data, and persistent flags. Item 218 represents one or more Platform Configuration Registers (PCRs) used for storing measurement digests. A PCR could be implemented in Non-Volatile Storage item 220. These PCRs could be reset at system start or whenever a platform loses power. The minimum number of PCRs specified by TCG is 16. TCG specifies that registers 0-7 are reserved for TPM use and registers 8-15 are available for operating system and application use. Item 216 is the attestation identity key (AIK) which could be stored permanently inside TPM non-volatile storage item 220. Item 214 is program code which could contain firmware for measuring platform devices. Item 214 could contain program code for managing pages of PCRs in accordance with an embodiment of the present invention. Item 202 is a Random Number Generator (RNG) which may be used for key generation. Item 204 is a SHA-1 Engine that may be used for measuring code, measuring data, computing signatures, creating keys, and for general purpose use. Item 206 is a Key Generation Engine which may be used for creating signing keys and storage keys. Item 208 is an Opt-In component for implementing the TCG policy requiring TPM modules to be shipped in a state specified by a customer. Item 210 is an RSA Engine used for signing with signing keys and encryption/decryption with storage keys. Item 212 is the execution engine used for running program code and performing TPM initialization and measurements.

TPMs, such as that shown in FIG. 2, may provide three basic services including platform identity, cryptographic services, and protected storage. Platform identity is the ability to uniquely identify a platform and verify that the platform uses trusted computing methods. Cryptographic services include functions to allow encryption, decryption, and key generation to be performed in a secure manner. Cryptographic services may include a hashing algorithm such as SHA-1, key capabilities, secure key storage, a random number generator, and a unique key to identify each TPM. Protected storage limits the access to storage areas to certain secure functions. Integration of a TPM chip into a platform such as item 113 shown in FIG. 1 can be done in numerous ways. For example, the TPM may be physically attached and integrated into a platform through a physical connection such as soldering. TCG currently specifies that the TPM be physically protected from tampering (tamper resistant) to help prevent disassembly and transfer to other platforms.

As a practical matter, only small portions of data should be stored in secure and shielded locations such as non-volatile storage 220. Rather than shielding a storage area for maximum security, it may be more practical to encrypt data and store the encrypted data in an unshielded location, such as data storage 120, for example, as shown in FIG. 1. Once data is encrypted, a key is needed to interpret the data. If adverse software changes the encrypted data, the data processing system 113 (FIG. 1) can determine upon decryption that the integrity of the data was breached because the decrypted data will be essentially indecipherable. Therefore, a trusted system may use a cryptographic means such as key generation item 206 to encrypt data for storage on a hard disk such as storage 120 (FIG. 1), or any other memory external to the TPM 200.

Figure 3:
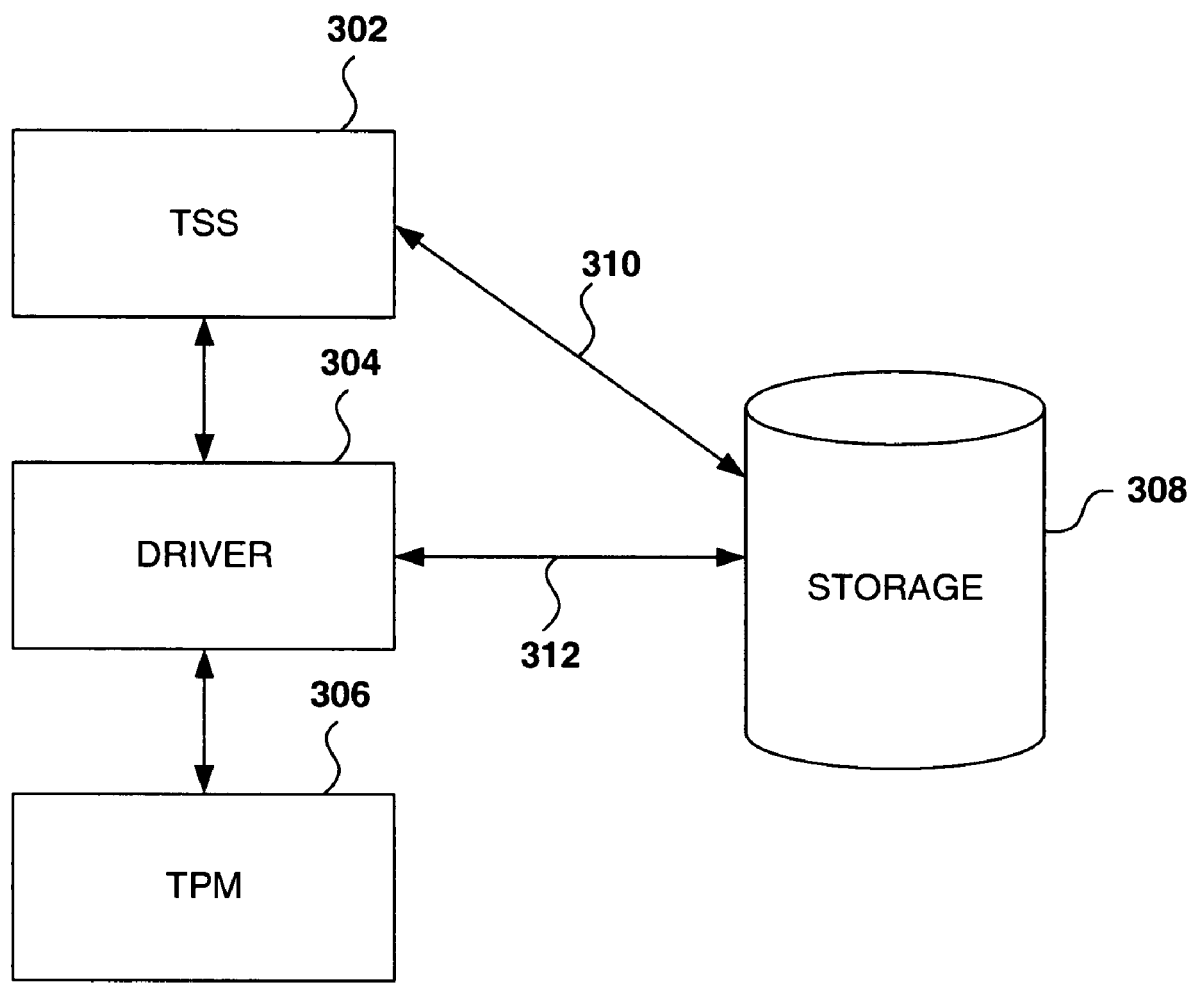
FIG. 3 illustrates software hierarchy for an embodiment of the present invention.

Referring to FIG. 3, FIG. 3 illustrates software hierarchy 300 for an embodiment of the present invention. Item 302 represents a Trusted Platform Support Services element (TSS). The TSS 302 provides mechanisms and instructions for cryptographically reporting the current hardware and software configurations of data processing system 113 (FIG. 1), for example, to local and remote challengers. Local or remote challengers could be data processing systems like item 113 in FIG. 1. The TSS 302 may also provide a facility whereby platform software or firmware may lock or seal data or code to allow access only when the platform is in a defined configuration. Software applications may call the TSS 302, and the TSS 302 may then call the driver shown as item 304. In turn, the driver 304 communicates with the TPM hardware shown as item 306. TPM hardware 306 could be a TPM hardware module as shown in FIG. 1 as item 142. Item 310 represents the TSS 302 performing PCR content management of PCRs, shown for example as item 218 (FIG. 2). TSS 302 may perform content management, for example, by storing values to PCRs and retrieving the PCR values. Content management could also include cryptographically storing PCR registers on storage medium shown as item 308 and retrieving the PCR registers as requested. Storage 308 may be any storage residing on or off the TPM 306. In one embodiment, storage 308 corresponds to non-volatile storage 220 (FIG. 2) and in another embodiment storage 308 corresponds to storage 120 (FIG. 1). FIG. 3 also illustrates driver 304 performing PCR content management over item 312. PCR content management by driver 304 could comprise storing and cataloging PCR content files on storage media 308. Items 310 and 312 represent the TSS 302 and/or driver 304 performing PCR content management. Whether the management software is implemented by driver 304 or TSS 302, the management software retrieves PCR contents from storage 308 when the TPM requests such contents.

In one embodiment, the TSS 302 generates a measurement digest and a measurement log upon measuring code. The measurement digest may be stored in a PCR on the TPM; however, in one embodiment the measurement digest is encrypted and stored in memory external to the TPM. Storage 120 from FIG. 1 is an example of external memory for storing encrypted measurement digests. In a TCG compliant system, data or code to be measured is appended to the end of a measurement digest and the combination is hashed. Algebraically, in a TCG compliant system, updates to a PCR are represented as follows: $PCR[n]=SHA-1$ $(PCR[n]+measured$ $data)$. Such a procedure may be referred to as "extending the digest." Extending the digest allows for the same value to reside in a measurement digest (PCR) during a given platform state, assuming no person or software has tampered with the measured code or data. The PCRs, shown as item 218 (FIG. 2), may contain the measurement digests. Verification of measurement events could require recreation of the measurement digest and a simple compare of measurement log values (using the PCR value as one of the comparators).

Figure 4:
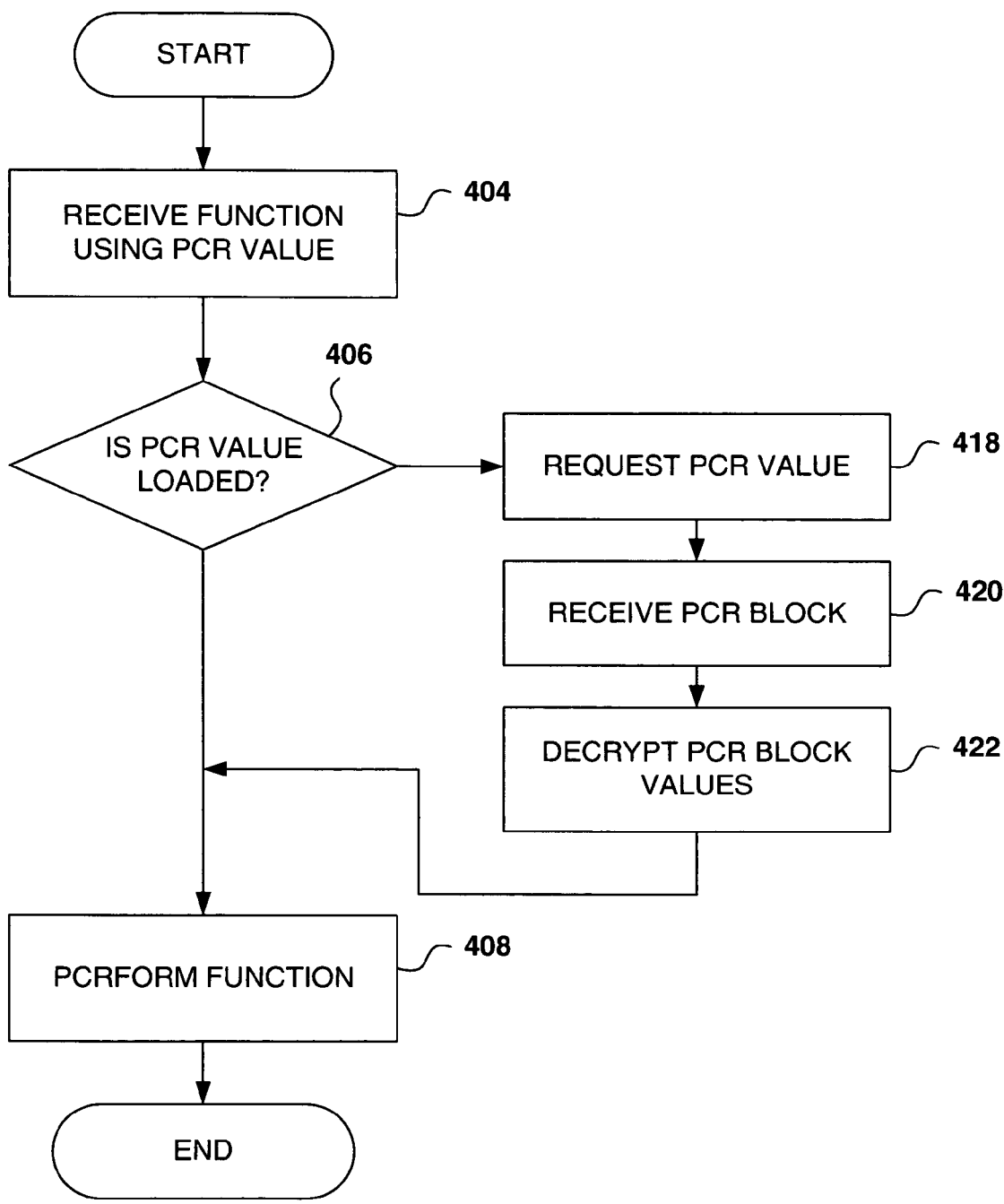
FIG. 4 is a flowchart of a method for managing PCR blocks in accordance with an embodiment of the present invention.

Referring to FIG. 4, FIG. 4 is a flow diagram of method 400 for managing PCR blocks in accordance with an embodiment of the present invention. In step 404, software receives a function which requires a specific PCR value. In one embodiment, the software that receives the function requiring the specific PVR value is a PCR manager such as TSS 302 from FIG. 3. For example, software could send a TPM_Extend function requesting PCR 0x3004000. In step 406, the software determines whether the PCR value is already loaded into the TPM. If the PCR value is not loaded into the TPM as determined by step 406, the TPM requests that the software send the PCR value to the TPM as shown in item 418. In one embodiment, the TSS 302 sends the PCR value to the TPM 306, as depicted in FIG. 3. In turn, the software finds the correct PCR value and sends it to the TPM. In step 420, the software receives a PCR block including the requested PCR value. In step 422, the TPM decrypts the PCR block values and stores the requested PCR values on the TPM. In step 408, the TPM_Extend function is performed.

Figure 5:
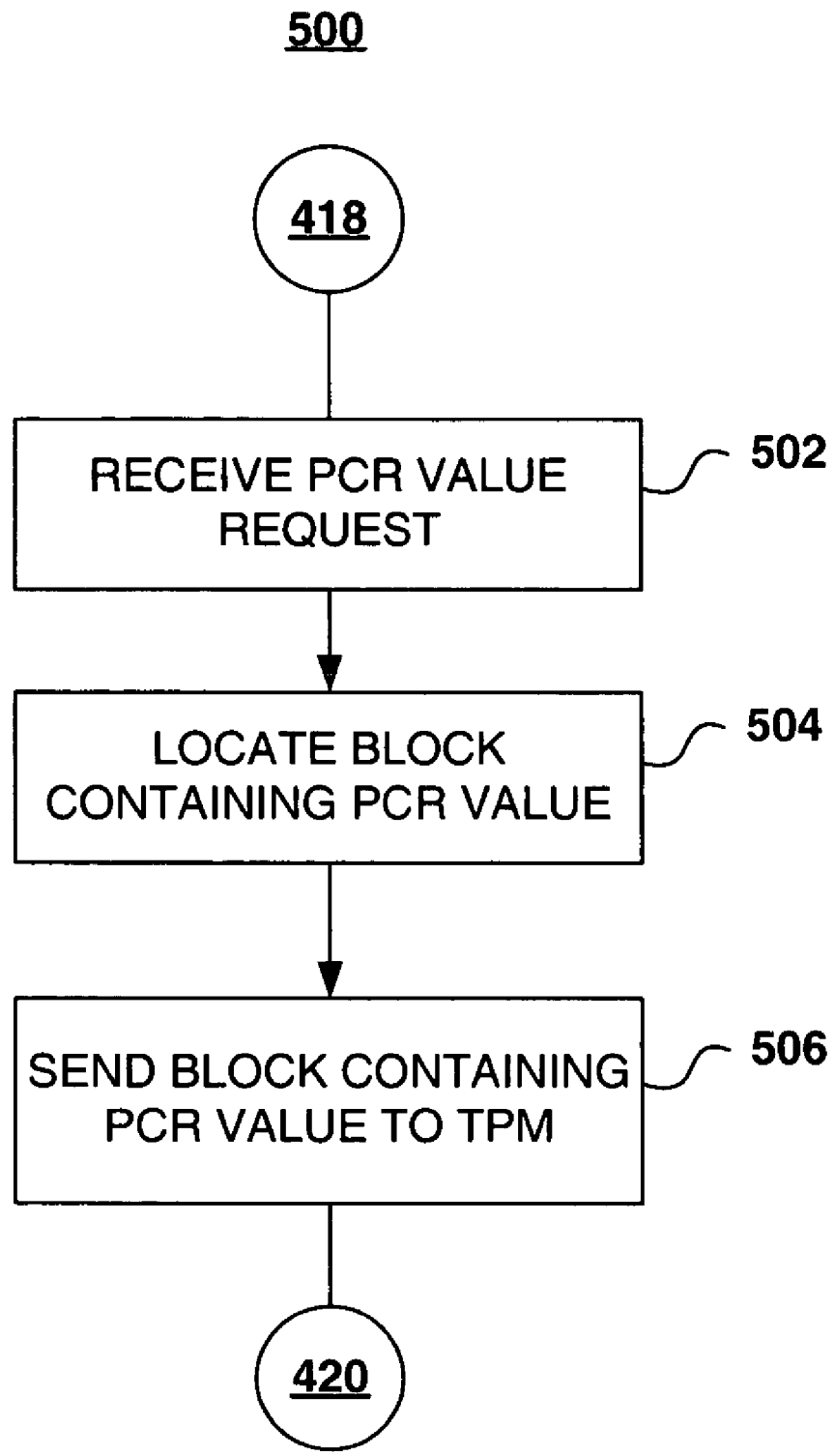
FIG. 5 is a flowchart of a method for paging PCR registers in accordance with an embodiment of the present invention.

Referring to FIG. 5, FIG. 5 is a flow diagram of method 500 for a PCR manager providing requested PCR values to a TPM in accordance with an embodiment of the present invention. The PCR manager could be TSS 302 or driver 304 from FIG. 3, for example. In step 502, the PCR manager receives a PCR value request. In step 504, the PCR manager locates the block containing the PCR value. The PCR block could reside in storage 120 as shown in FIG. 1 or in item 308 as shown in FIG. 3. After locating the block containing the PCR value in step 504, the PCR manager sends the block containing the PCR value to the TPM in step 506. After sending the block containing the PCR value to the TPM, the TPM decrypts the PCR block as shown in step 422 in FIG. 4.

Figure 6:
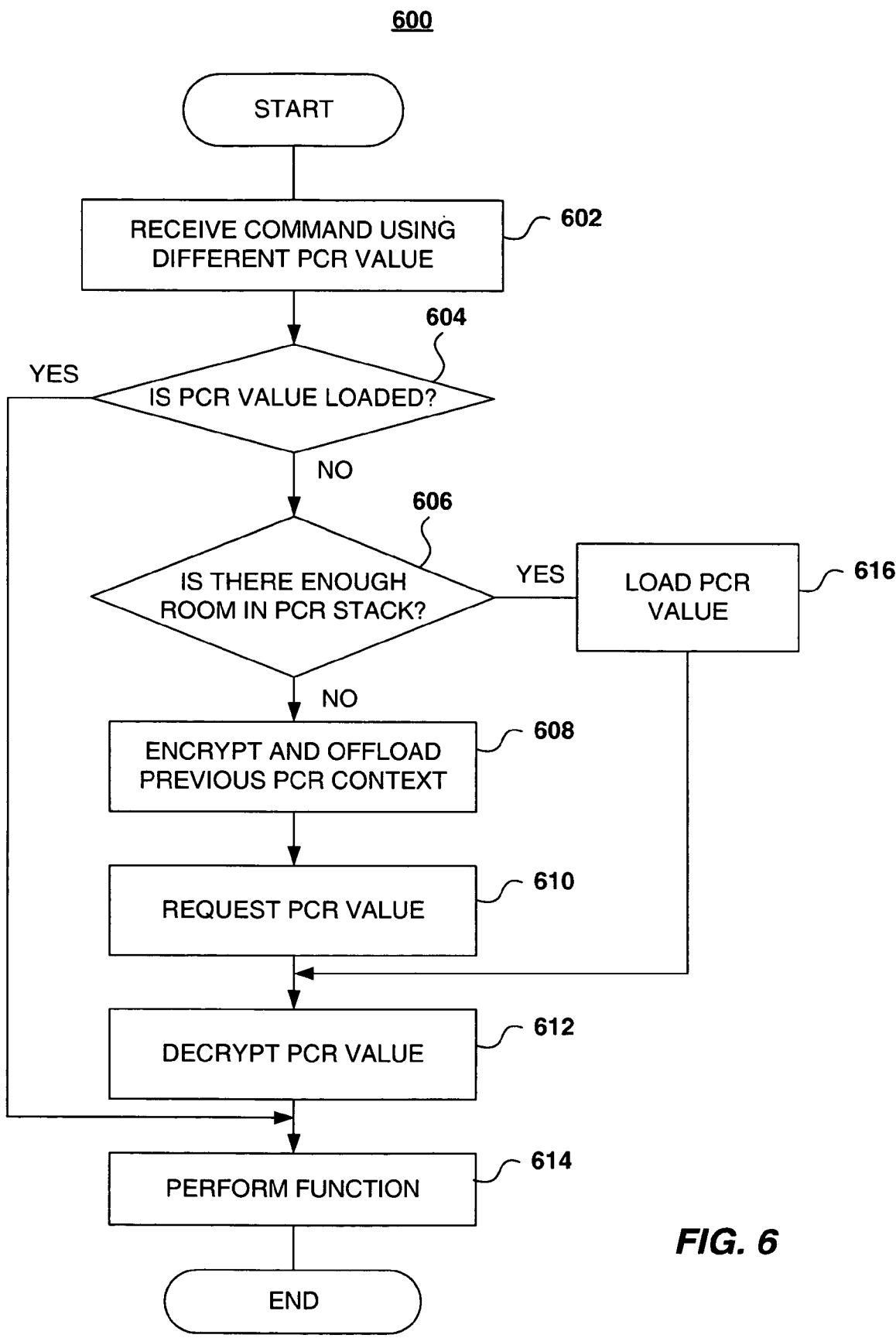
FIG. 6 is a flowchart of a method for paging PCR registers in accordance with embodiment of the present invention.

Referring to FIG. 6, FIG. 6 is a flowchart of method 600 for providing additional PCR values in accordance with an embodiment of the present invention. Method 600 may occur once another PCR value is requested following method 400 from FIG. 4. Step 602 represents software making another TPM request using another PCR value. In step 604, the software determines whether the PCR value is loaded. In one embodiment, TSS 302 could determine whether PCR value x00D was loaded, for example. If the PCR value is loaded as determined in step 602, then the software skips to step 614 for performing the function needing the PCR value. However, if the PCR value is not loaded as determined in step 604, the software proceeds to step 606 for determining whether there is enough room in the PCR stack for loading the context containing the requested PCR value in addition to the resident PCR context. If there is not enough room as determined in step 606, the TPM could encrypt and offload the previous PCR context and request a new PCR object in step 610. The PCR context could be formatted and encrypted using an internal key (either asymmetric or symmetric) and sent to the software. The software could be, for example, driver 304 or the TSS 302 as shown in FIG. 3. If it is determined in step 606 that there is enough room to load the new PCR context, then the PCR value and associated context is loaded in step 616. In step 612, the new PCR value is decrypted by the TPM. In step 614, the requested function is performed using the requested PCR value.

Figure 7:
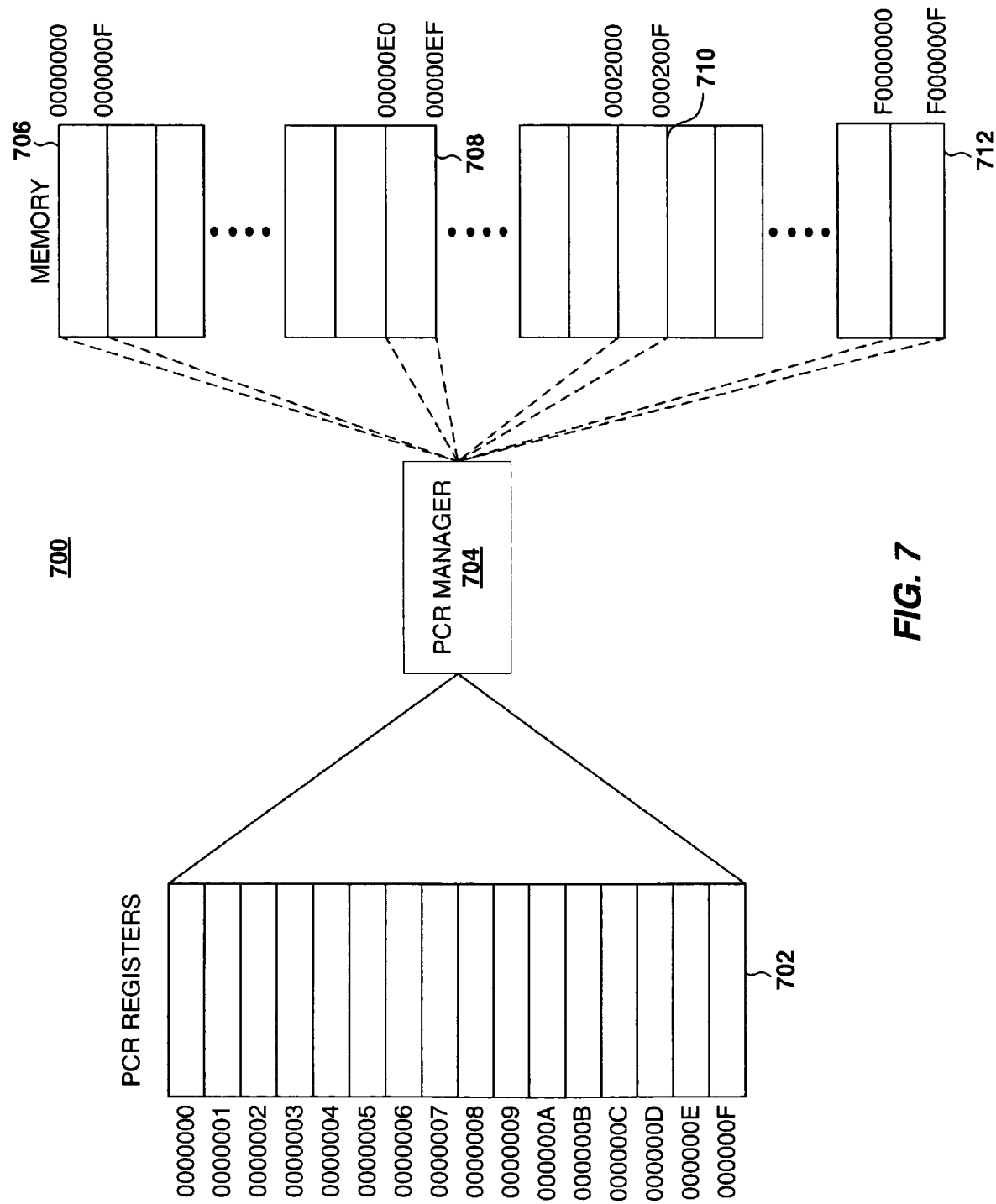
FIG. 7 illustrates a scheme for paging PCR register values in and out of memory in accordance with an embodiment of the present invention.

Referring to FIG. 7, FIG. 7 is a pictorial representation of a PCR register paging scheme 700 implemented in accordance with an embodiment of the present invention. A PCR manager 704 receives requests for PCR values, which could be stored in memory shown as items 706, 708, 710 and 712. Memory 706, 708, 710, and 712 could contiguous or non-contiguous blocks of memory located in storage 120 (FIG. 1), for example. PCR manager 704 retrieves blocks from memory and sends the blocks to PCR registers shown as item 702. PCR manager could be, for example, TSS 302 or driver 304 as depicted in FIG. 3. In the embodiment shown in FIG. 7, PCR registers 702 contain sixteen register addresses depicted as 0000000-000000F. These sixteen PCR values in item 702 could be retrieved by PCR manager 704 from the memory block shown as item 706. Using such a scheme as shown in methodology 700, PCR manager 704 can facilitate access to any number of PCR registers that is limited only by the size of memory, which could be for example storage 120 (FIG. 1). Such scaling of PCRs is advantageous in that it provides program developers more flexibility when sealing data to PCR register values. Further, scalable PCR storage facilitates the updating and changing of software drivers, for example, without many of the limitations caused by having only sixteen PCRs as specified by TCG Through encryption, integrity of externally stored PCR values is maintained.

Although the present invention and its advantages have been described in detail, it should be understood that various changes, substitutions and alterations can be made herein without departing from the spirit and scope of the invention as defined by the appended claims.

What is claimed is:

1. A method of managing Platform Configuration Register (PCR) values comprising:
   receiving a request for a first PCR value;
   comparing the first PCR value to a loaded value, wherein the loaded value is stored in a PCR register stack; and
   downloading an encrypted version of the first PCR value if the first PCR value is not loaded in the PCR register stack.

2. The method of claim 1 further comprising the step of decrypting the encrypted version of the first PCR value.

3. The method of claim 1 wherein the step of downloading the encrypted version of the first PCR value comprises downloaded a page of data, wherein the page of data comprises the encrypted version of the PCR value.

4. The method of claim 3 further comprising the step of performing a hash using the first PCR value.

5. The method of claim 1 wherein the PCR register stack is stored in a first hardware device that is more tamper-resistant than a second hardware device used for storing the encrypted version of the first PCR value.

6. The method of claim 5 further comprising the steps of:
   generating an encrypted loaded value by encrypting the loaded value; and
   storing the encrypted loaded value in the second hardware device.

7. The method of claim 1 further comprising the steps of:
   receiving a request for a second PCR value;
   comparing the second PCR value to the loaded value to determine if the loaded value is the second PCR value;
   downloading an encrypted version of the second PCR value if the loaded value is not the second PCR value.

8. The method of claim 1 further comprising the steps of:
   determining whether there is sufficient room in the PCR register stack for downloading the second PCR value if the loaded value is not the second PCR value;
   offloading the contents of the PCR register stack, wherein the offloading occurs if there is not sufficient room in the PCR register stack for downloading the second PCR value.

9. The method of claim 8, wherein the step of offloading the contents of the PCR register stack further comprises the step of encrypting the contents of the PCR register stack.

10. A computer program product embodied in a machine readable medium for managing Platform Configuration Registers comprising the programming steps of:
    receiving a request for a first PCR value;
    comparing the first PCR value to a loaded value, wherein the loaded value is stored in a PCR register stack; and
    downloading an encrypted version of the first PCR value if the first PCR value is not loaded in the PCR register stack.

11. A computer program product of claim 10 further comprising the step of decrypting the encrypted version of the first PCR value.

12. A computer program product of claim 10 wherein the step of downloading the encrypted version of the first PCR value comprises downloaded a page of data, wherein the page of data comprises the encrypted version of the PCR value.

13. A computer program product of claim 12 further comprising the step of performing a hash using the first PCR value.

14. A computer program product of claim 10 wherein the PCR register stack is stored in a first hardware device that is more tamper-resistant than a second hardware-device used for storing the encrypted version of the first PCR value.

15. A computer program product of claim 14 further comprising the steps of:
    generating an encrypted loaded value by encrypting the loaded value; and
    storing the encrypted loaded value in the second-hardware device.

16. A computer program product of claim 10 further comprising the steps of:
    receiving a request for a second PCR value;
    comparing the second PCR value to the loaded value to determine if the loaded value is the second PCR value;
    downloading an encrypted version of the second PCR value if the loaded value is not the second PCR value.

17. A computer program product of claim 10 further comprising the steps of:
    determining whether there is sufficient room in the PCR register stack for downloading the second PCR value if the loaded value is not the second PCR value;
    offloading the contents of the PCR register stack, wherein the offloading occurs if there is not sufficient room in the PCR register stack for downloading the second PCR value.

18. A computer program product of claim 17 further wherein the step of offloading the contents of the PCR register stack further comprises the step of encrypting the contents of the PCR register stack.

19. A system comprising:
    a processor;
    a first memory unit coupled to the processor, wherein the memory unit is operable for storing a computer program for managing Platform Configuration Registers (PCR) values;
    a second memory unit;
    a trusted platform module (TPM) coupled to the second memory unit, wherein a first PCR value resides in the second memory unit, wherein the computer program generates an encrypted first PCR value by encrypting the first PCR value, wherein the computer program stores the encrypted first PCR value in the first memory unit, wherein the computer program receives an encrypted second PCR value from the first memory unit, wherein the computer program generates a second PCR value by decrypting the encrypted second PCR value, wherein the second memory module is located within the TPM and the first memory module is not located within the TPM.

20. The system of claim 19 further comprising:
    a hash engine, wherein the hash engine uses an algorithm for hashing a concatenation of the second PCR value and an instruction.

* * * * *

UNITED STATES PATENT AND TRADEMARK OFFICE
CERTIFICATE OF CORRECTION

PATENT NO. : 7,653,819 B2 Page 1 of 1
APPLICATION NO. : 10/957545
DATED : January 26, 2010
INVENTOR(S) : Bade et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1517 days.

Signed and Sealed this

Twenty-third Day of November, 2010

David J. Kappos
*Director of the United States Patent and Trademark Office*